United States Patent
Matsushita et al.

(10) Patent No.: US 11,433,843 B2
(45) Date of Patent: Sep. 6, 2022

(54) OCCUPANT RESTRAINING DEVICE

(71) Applicant: Autoliv Development AB, Vargarda (SE)

(72) Inventors: Tetsuya Matsushita, Kanagawa (JP); Hiroyuki Saito, Kanagawa (JP)

(73) Assignee: Autoliv Development AB, Ogden, UT (US)

( * ) Notice: Subject to any disclaimer, the term of this patent is extended or adjusted under 35 U.S.C. 154(b) by 0 days.

(21) Appl. No.: 17/285,005

(22) PCT Filed: Sep. 25, 2019

(86) PCT No.: PCT/JP2019/037529
§ 371 (c)(1),
(2) Date: Apr. 13, 2021

(87) PCT Pub. No.: WO2020/080050
PCT Pub. Date: Apr. 23, 2020

(65) Prior Publication Data
US 2021/0387588 A1 Dec. 16, 2021

(30) Foreign Application Priority Data
Oct. 16, 2018 (JP) .............................. JP2018-194968

(51) Int. Cl.
*B60R 21/207* (2006.01)
*B60R 21/215* (2011.01)
(Continued)

(52) U.S. Cl.
CPC .......... *B60R 21/207* (2013.01); *B60R 21/215* (2013.01); *B60R 21/233* (2013.01); *B60R 21/2338* (2013.01); *B60R 2021/23388* (2013.01)

(58) Field of Classification Search
CPC ... B60R 21/207; B60R 21/215; B60R 21/233; B60R 21/2338; B60R 2021/23388; B60R 2021/161; B60R 2021/23386
See application file for complete search history.

(56) References Cited

U.S. PATENT DOCUMENTS 6,029,993 A * 2/2000 Mueller .............. B60R 21/2338
280/730.2
8,899,619 B2 * 12/2014 Fukawatase .......... B60R 21/207
280/730.2
(Continued)

FOREIGN PATENT DOCUMENTS

| CN | 103661230 A | 3/2014 |
| CN | 106687339 A | 5/2017 |

(Continued)

OTHER PUBLICATIONS

English computer translation of JP 2009029182 to Shiro et al.*

*Primary Examiner* — Paul N Dickson
*Assistant Examiner* — Tiffany L Webb
(74) *Attorney, Agent, or Firm* — Harness, Dickey & Pierce, P.L.C.; Stephen T. Olson

(57) ABSTRACT

A vehicle occupant restraining device, comprising: a pair of air bags; an inner bag housed in at least one of the pair of air bags, is in communication with the at least one of the air bags, and is inflated and deployed inside the at least one of the air bags, on the sides of the body of a vehicle occu-pant; and a pair of pieces of tension cloth housed so as to extend along the respective sides of a housed pair of air bags, which are located on the opposite sides of the vehicle occupant, and then through the inside of the seat back of a seat into a seat cushion, wherein the inner bag completes inflation and deployment before the at least one of the air bags does, and the pair of pieces of tension cloth is deployed on the sides of the seat.

12 Claims, 8 Drawing Sheets

(51) Int. Cl.
*B60R 21/233* (2006.01)
*B60R 21/2338* (2011.01)

(56) References Cited

U.S. PATENT DOCUMENTS

| | | | | |
|---|---|---|---|---|
| 9,056,591 | B2* | 6/2015 | Fujiwara | B60R 21/233 |
| 10,189,432 | B2* | 1/2019 | Matsushita | B60R 22/00 |
| 10,308,206 | B2* | 6/2019 | Fujiwara | B60R 21/23138 |
| 10,518,738 | B2* | 12/2019 | Kobayashi | B60R 21/239 |
| 10,864,878 | B2* | 12/2020 | Nagasawa | B60R 21/207 |
| 10,882,486 | B2* | 1/2021 | Okada | B60R 21/2334 |
| 2014/0062069 | A1 | 3/2014 | Fukawatase | |
| 2015/0367804 | A1 | 12/2015 | Fujiwara | |
| 2016/0107604 | A1* | 4/2016 | Fujiwara | B60R 21/23138 |
| | | | | 280/729 |
| 2017/0259774 | A1 | 9/2017 | Matsushita et al. | |
| 2019/0118759 | A1 | 4/2019 | Kobayashi et al. | |
| 2020/0406855 | A1* | 12/2020 | Saito | B60R 21/2338 |

FOREIGN PATENT DOCUMENTS

| | | |
|---|---|---|
| CN | 109641565 A | 4/2019 |
| DE | 102015117329 A1 | 4/2016 |
| EP | 2960117 A1 | 12/2015 |
| EP | 3192706 A1 | 7/2017 |
| EP | 3459796 A1 | 3/2019 |
| JP | 2009-29182 A | 2/2009 |
| JP | 2013-220714 A | 10/2013 |
| JP | 2014-51138 A | 3/2014 |
| JP | 2016-7901 A | 1/2016 |
| JP | 2016-78768 A | 5/2016 |
| JP | 2017-74850 A | 4/2017 |
| KR | 10-2015-0146439 A | 12/2015 |
| KR | 10-2017-0036014 A | 3/2017 |
| KR | 10-2018-0128949 A | 12/2018 |
| WO | 2016/039160 A1 | 3/2016 |
| WO | 2017/199851 A1 | 11/2017 |

* cited by examiner

[FIG. 1]
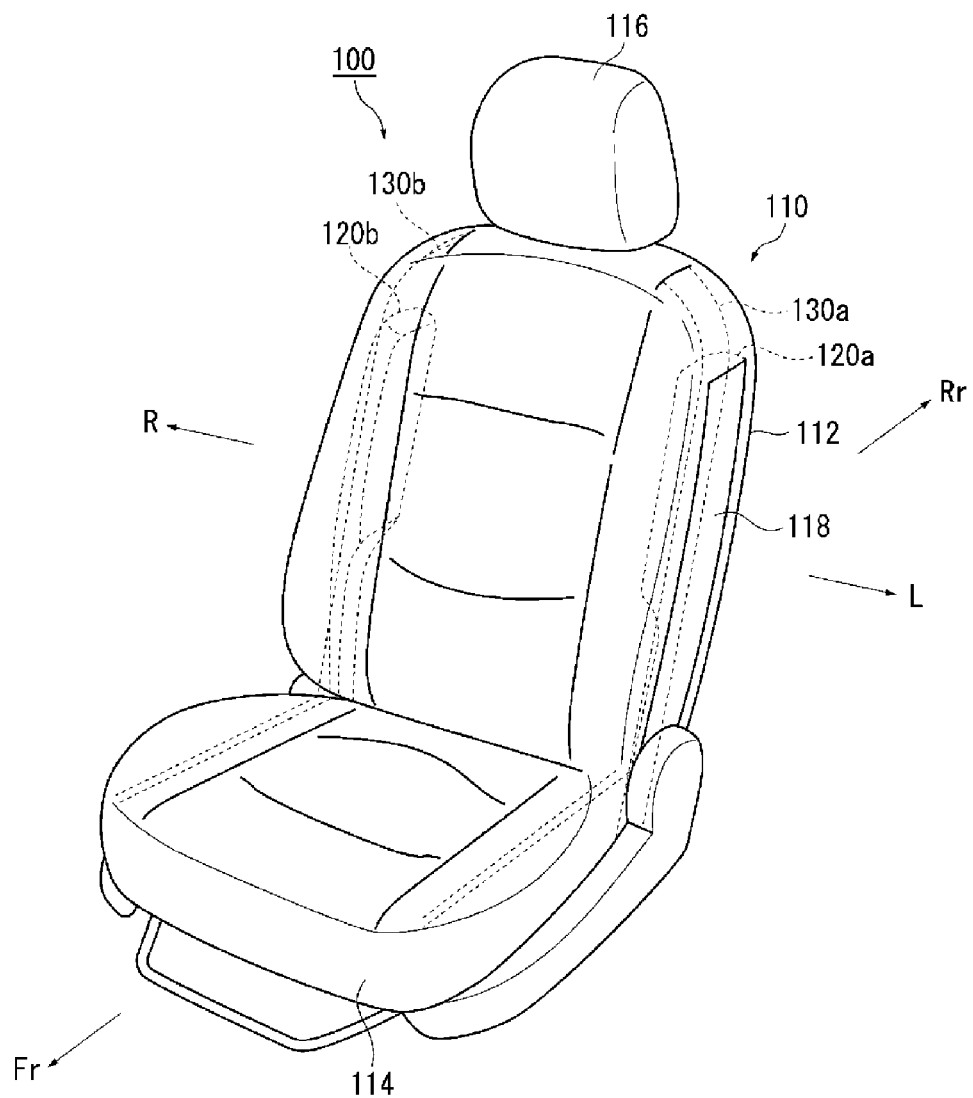

[FIG. 2]
(a)
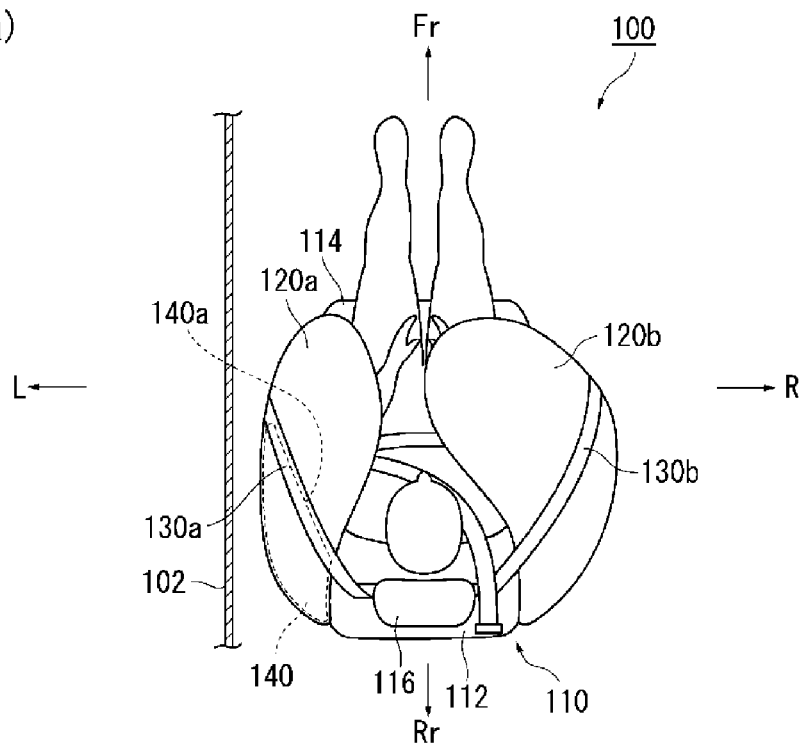
(b)
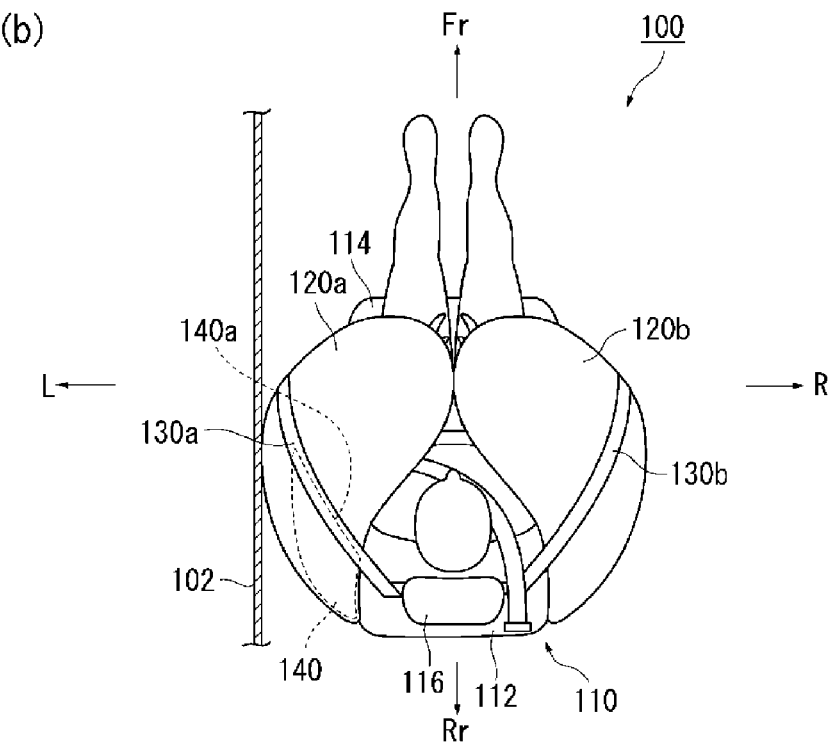

[FIG. 3]
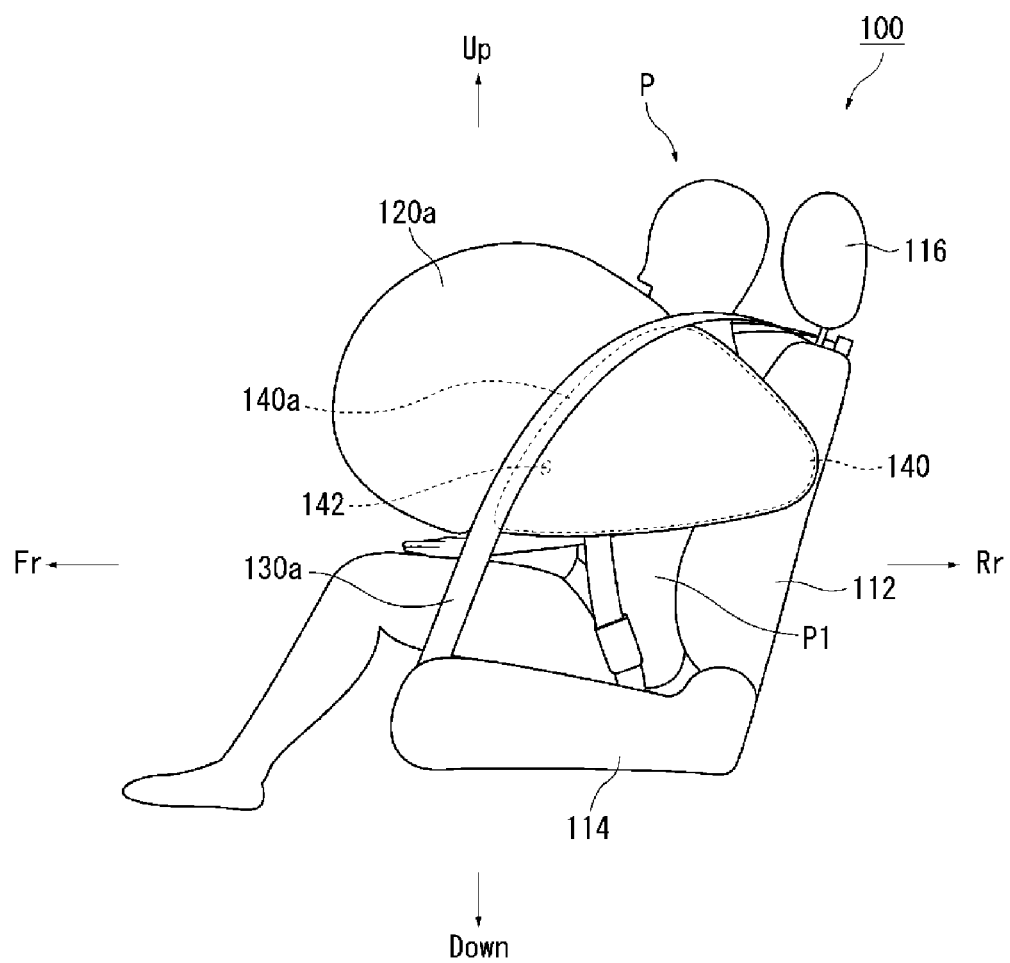

[FIG. 4]
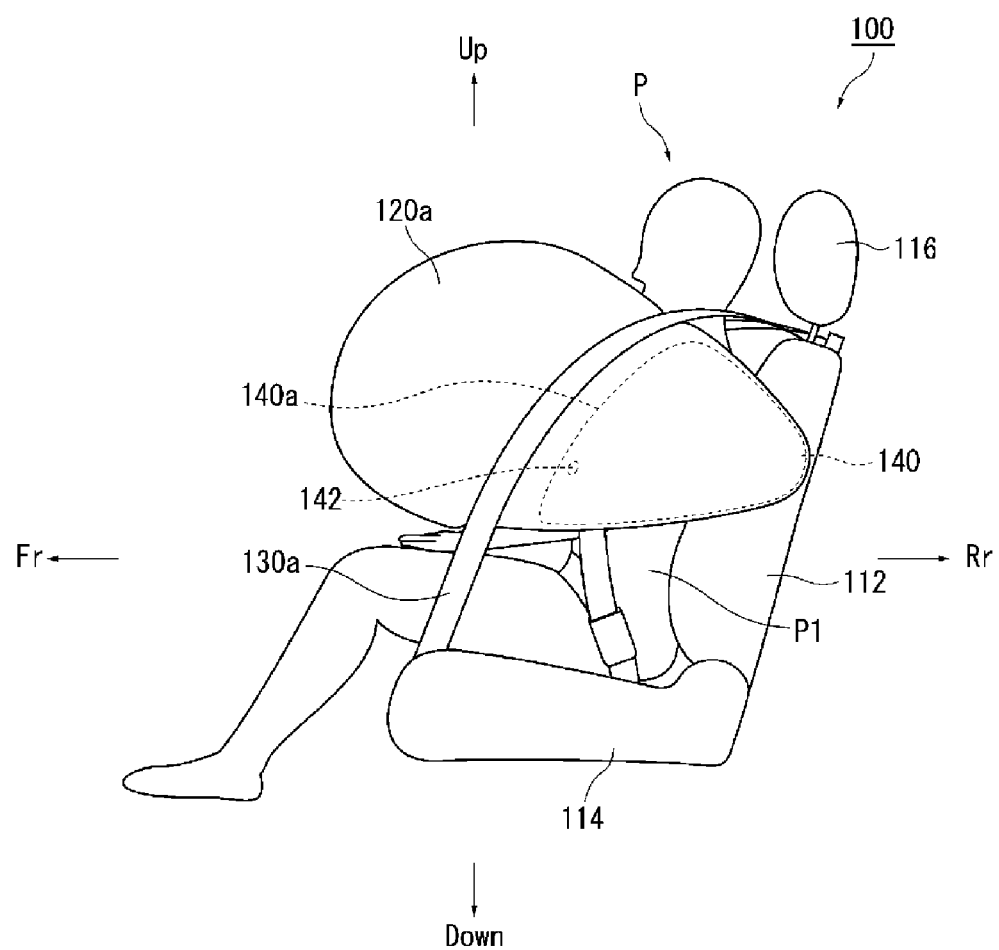

[FIG. 5]
(a)
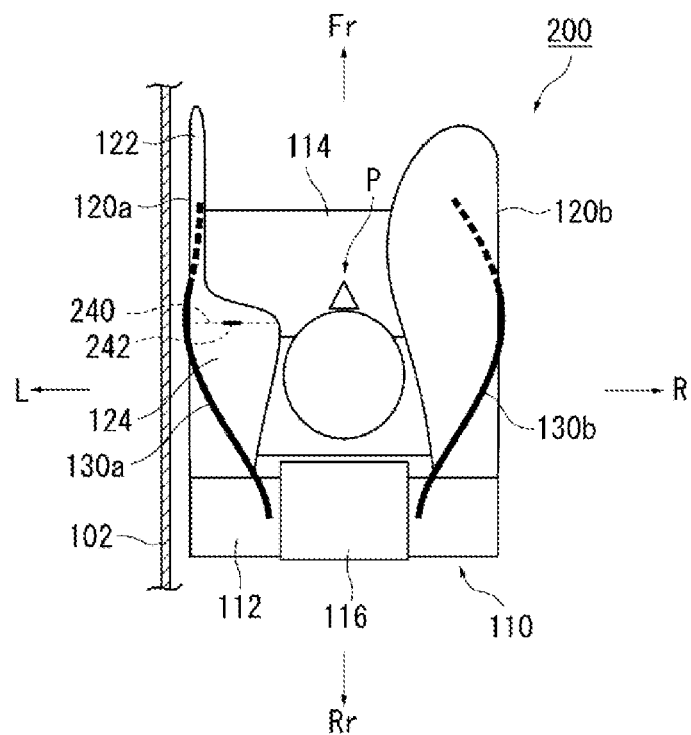
(b)
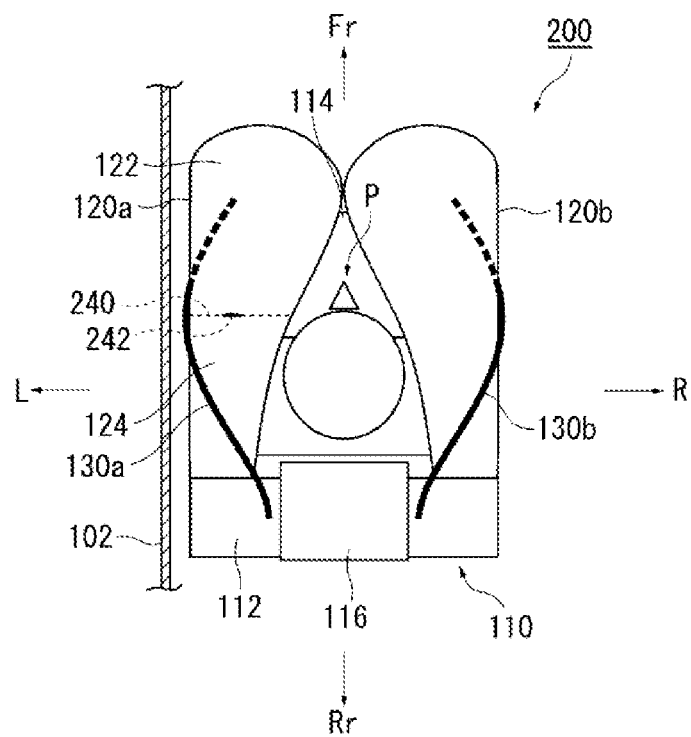

[FIG. 6]
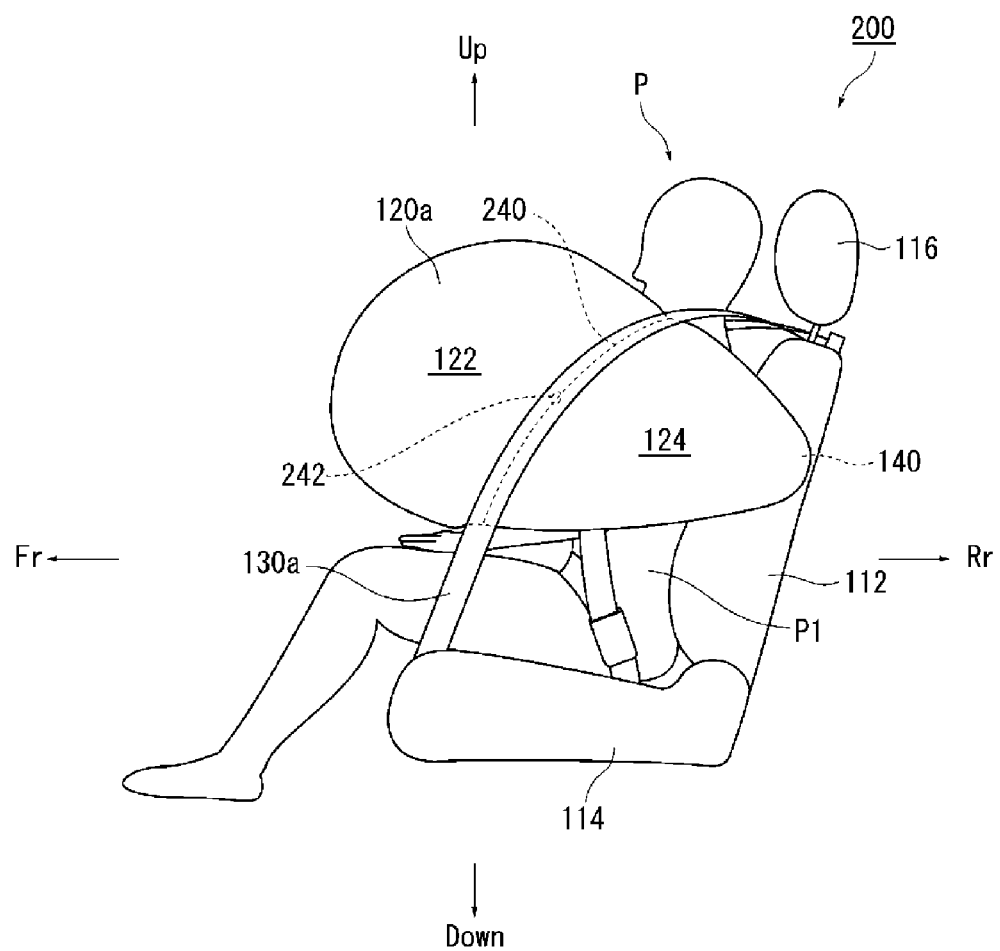

[FIG. 7]
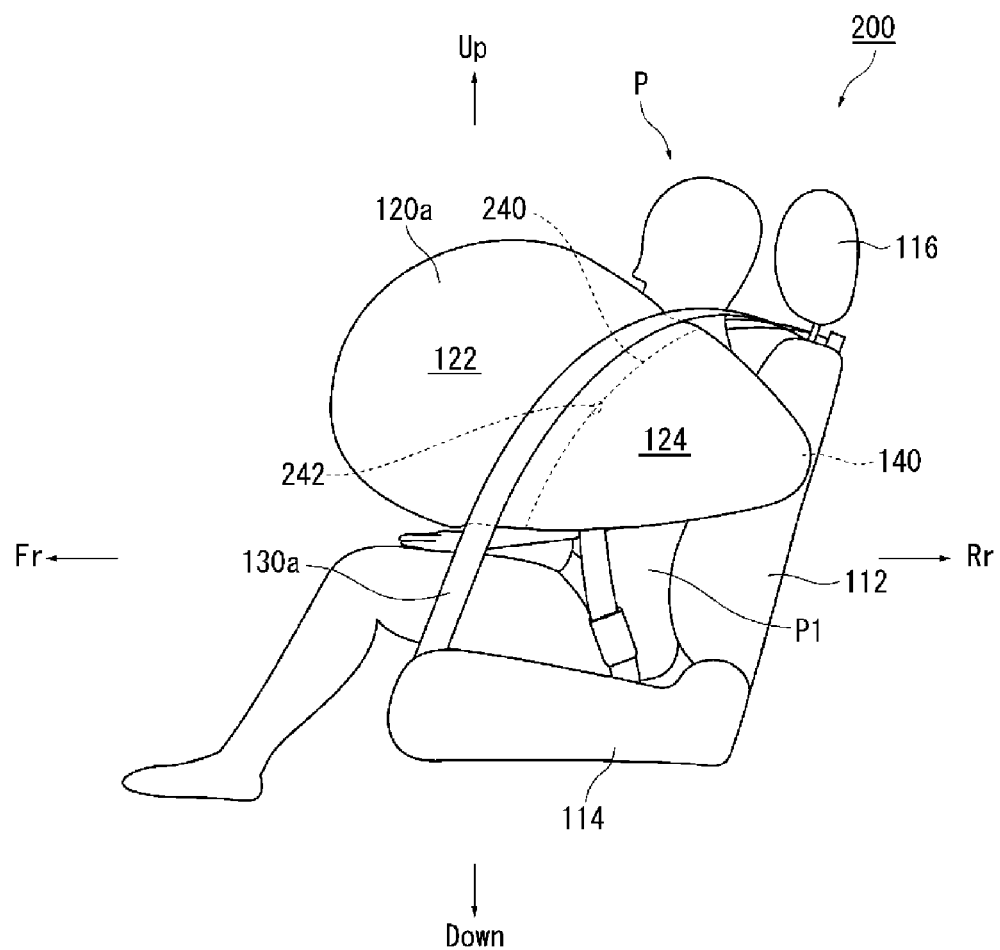

[FIG. 8]
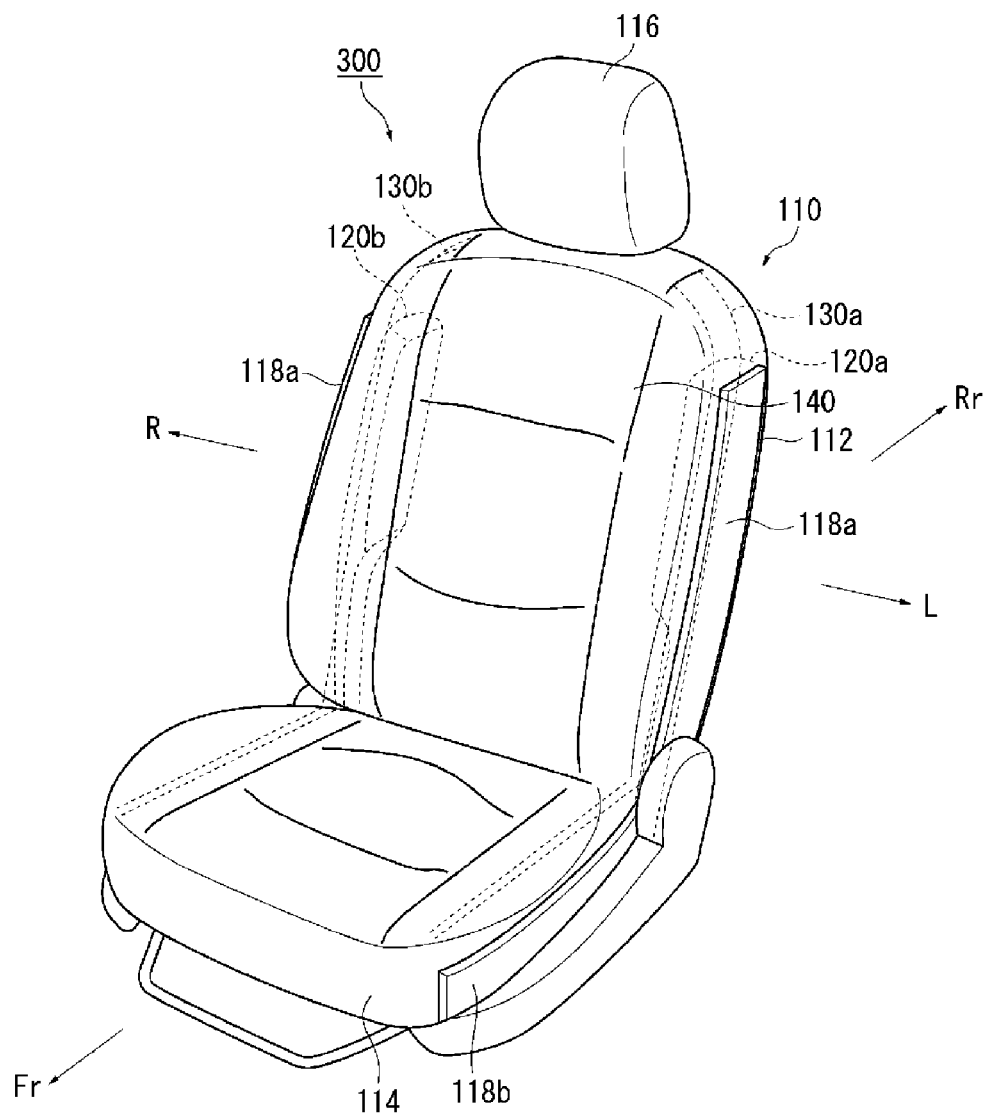

OCCUPANT RESTRAINING DEVICE

TECHNICAL FIELD

The present invention relates to an occupant restraining device that restrains an occupant sitting on a seat of a vehicle.

BACKGROUND

Airbag devices have generally become standard equipment in vehicles in recent years. An airbag device is a safety device which is operated in case of an emergency such as a vehicle collision and, for example, expands and deploys to protect the occupant. There are various types of airbag devices depending on the installation site and application. For example, a side airbag that expands and deploys to the immediate sides of an occupant on both sides of a seat is provided in an occupant restraining device in Patent Document 1.

In particular, in the occupant restraining device of Patent Document 1, a tensile cloth is provided that is tensioned during expansion and deployment of the airbag and extends between both sides of the airbag and the seat cushion. Thereby, an effect of suppressing movement of the airbag in the left-right direction by the tensile cloth can be increased. Therefore, occupant restraining performance by the airbag can be further increased.

RELATED ART DOCUMENTS

Patent Documents

[Patent Document 1] WO 2016-039160

SUMMARY OF THE INVENTION

Problem to be Solved by the Invention

According to the occupant restraining device of Patent Document 1, movement of the airbag in a direction away from the occupant can be suitably controlled by the tensile cloth, particularly in the left-right direction, and occupant restraining performance by the airbag has increased dramatically. However, there is always a need to improve occupant restraining performance for occupant restraining devices. For this reason, the inventors investigated further improvement of the technology of Patent Document 1.

In light of this type of problem, an object of the present invention is to provide an occupant restraining device capable of further improving occupant restraining performance with a structure having tensile cloth that deploys on the side part of a seat during expansion and deployment of an airbag.

Means for Solving the Problem

In order to resolve the problems described above, a typical configuration of the occupant restraining device of the present invention includes a pair of airbags stowed inside the seatback of a seat that expand and deploy respectively to both sides of an occupant seated in a seat, an inner bag that is stowed inside at least a first of the pair of airbags and is connected to the at least the first airbag and expands and deploys inside the at least first airbag to the side of the torso of the occupant, and a pair of tensile cloths stowed from within the seatback of the seat to within the seat cushion along a side of the stowed pair of airbags opposite the occupant respectively, wherein the inner bag completes expansion and deployment prior to at least a first of the airbags, and the pair of tensile cloths deploy to the side of the seat by expansion and deployment of the pair of airbags and are stretched from the seatback to the seat cushion to retain the pair of airbags on the side opposite the occupant.

According to the above configuration, the expanded and deployed airbag is biased towards the occupant by the tensile cloth. This enables suppressing movement of the airbag in a direction away from the occupant and restraining of the occupant more securely. In the configuration described above, an inner bag is stowed inside the airbag. The inner bag has a smaller volume than the airbag being contained within the airbag, and therefore requires less gas to expand and deploy. Therefore, the inner bag completes expansion earlier than the airbag. As a result, the torso of the occupant can be restrained quickly in the event of a collision, especially a side impact, and the occupant restraining performance can be further improved.

The front end of the inner bag is arranged at or behind a position overlapping at least a first of the pair of tensile cloths in a side view when at least a first airbag expands and deploys. With this configuration, the tensile cloth does not stretch across the inner bag, and the tensile cloth does not inhibit the expansion and deployment of the inner bag. Therefore, the effects described above can reliably be obtained.

In order to resolve the problems described above, another configuration of the occupant restraining device according to the present invention is an occupant restraining device for restraining an occupant seated in a seat of a vehicle, including a pair of airbags stowed in a seatback of a seat that expand and deploy respectively on both sides of an occupant seated in the seat; a partition wall arranged inside at least a first of the pair of airbags that divide at least a first of the airbags into front and rear portions; a connecting hole formed in the partition wall; and a pair of tensile cloths stowed from within the seatback of the seat to within the seat cushion along the stowed pair of airbags respectively on the side opposite the occupant, wherein at least the first of the airbags completes expansion and deployment of the space behind the partition wall before the space in front of the partition wall, and the pair of tensile cloths are deployed to the side of the seat by the expansion and deployment of the pair of airbags and are stretched from the seatback to the seat cushion to retain the surfaces of the pair of airbags on the side opposite the occupant.

According to the configuration described above, the expanded and deployed airbag is again biased towards the occupant by the tensile cloth. This enables suppressing movement of the airbag in a direction away from the occupant and restraining of the occupant more securely. In the configuration described above, the interior of the airbag is partitioned into two spaces in the front-rear direction by a partition wall. In the airbag, the space in front of the partition wall is hereinafter referred to as the front chamber, and the space behind the partition wall is referred to as the rear chamber. The rear chamber is positioned to the side of the torso of the occupant and expands and deploys before the front chamber. As a result, the torso of the occupant can be restrained quickly in the event of a collision, especially a side impact, and the occupant restraining performance can be further improved.

The partition wall is arranged at or behind a position overlapping at least a first of the pair of tensile cloths in a side view when at least a first airbag expands and deploys.

As a result, the tensile cloth does not stretch across the rear chamber, and the tensile cloth does not inhibit expansion and deployment of the rear chamber. Therefore, the effects described above can reliably be obtained.

At least a first airbag described above may include an airbag positioned on the near side of the occupant. This enables suitable prevention of contact between the occupant and the vehicle body in the event of a side collision. Note, of the left and right sides of the occupant seated in a seat, the near side is the side on the vehicle body side, and of the left and right sides of the occupant seated in a seat, the far side is the side that is not on the vehicle body side.

The pair of tensile cloths described above may be deployed along the side of the seat by breaking the seat surface skin. Alternatively, the occupant restraining device may have a pair of cases arranged along the side of the seat for stowing the pair of airbags and the pair of tensile cloths, and the pair of tensile cloths may be deployed from the pair of cases to the side of the seat. With any of the configurations, the aforementioned effect can be favorably achieved.

Effects of the Invention

According to the present invention, an occupant restraining device capable of further improving occupant restraining performance in a configuration provided with a tensile cloth that is deployed along the side of a seat during expansion and deployment of an airbag can be provided.

BRIEF DESCRIPTION OF THE DRAWINGS

FIG. 1 is a diagram illustrating an occupant restraining device according to embodiment 1.

FIG. 2 is a diagram illustrating the state of the airbag of FIG. 1 during expansion and deployment.

FIG. 3 is a diagram illustrating the state of the airbag of FIG. 1 during expansion and deployment.

FIG. 4 is a diagram illustrating the state of the airbag of FIG. 1 during expansion and deployment.

FIG. 5 is a diagram illustrating an occupant restraining device according to embodiment 2.

FIG. 6 is a diagram illustrating an occupant restraining device according to embodiment 2.

FIG. 7 is a diagram illustrating an occupant restraining device according to embodiment 2.

FIG. 8 is a diagram describing another example of the occupant restraining device in this embodiment.

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Note that regarding this embodiment, when an occupant is seated in a seat in a regular posture, the direction the occupant faces is referred to as the front, and the opposite direction is referred to as the rear. Moreover, when the occupant is seated in the seat in a regular posture, the right of the occupant is referred to as the right direction, and the left of the occupant is referred to as the left direction. Furthermore, when the occupant is seated in a regular posture, the direction towards the head of the occupant is referred to as up, and the direction towards the legs of the occupant is referred to as down. In addition, as needed, any diagrams used in descriptions below will indicate the front, rear, left, right, up, and down directions based on the occupant as described above as Fr, Rr, L, R, Up, and Down.

Embodiment 1

FIG. 1 is a diagram illustrating an occupant restraining device 100 according to embodiment 1. For ease of understanding, FIG. 1 illustrates the members stowed inside a seat 110 using hidden lines. Furthermore, in FIG. 1, the seat is illustrated with the airbag not expanded and deployed.

The occupant restraining device 100 of the present embodiment is a device for restraining an occupant that is seated in the seat 110. As illustrated in FIG. 1, the occupant restraining device 100 of embodiment 1 includes the seat 110, airbags 120a and 120b, left side tensile cloth 130a, and right side tensile cloth 130b of the vehicle (full vehicle not shown). The seat 110 includes a seatback 112 that supports the upper body of the occupant. A seat cushion 114 is provided below the seatback 112 on which the occupant sits. A headrest 116 is provided above the seatback that supports the head of the occupant.

As illustrated in FIG. 1, the pair of airbags 120a and 120b (side airbags) are stowed in both the left and right sides of the seatback 112 of the seat 110, which are covered by covers 118. The cover 118 includes a part of the outer skin of the seat 110. The pair of airbags 120a and 120b expand and deploy on both sides of the occupant seated in the seat 110 during a collision or the like of the vehicle. A structure where a cover 118 is integrated with the surface skin of the seat is illustrated but is not limited thereto, and the seat surface skin and cover can be separate.

A pair of tensile cloths 130a and 130b are provided for each of the airbags 120a and 120b in this embodiment. The pair of tensile cloths 130a and 130b are respectively stored from inside the seatback 112 of the seat 110 to in the seat cushion 114 through the side of the stored pair of airbags 120a and 120b opposite the occupant.

FIG. 2, FIG. 3 and FIG. 4 are diagrams that illustrate the state of the airbags 120a and 120b of FIG. 1 during expansion and deployment. FIGS. 2(a) and 2(b) illustrate a state in which an occupant P is seated in the seat 110 illustrated in FIG. 1, and a state where the airbags 120a and 120b are expanded and deployed is observed from above. FIG. 3 and FIG. 4 illustrate a state where an occupant P is seated in the seat 110 illustrated in FIG. 1, and a state where the airbag 120a having been expanded and deployed is observed from the side.

As illustrated in FIGS. 2(a) and 2(b), of the left and right sides of the occupant P, a vehicle body 102 is positioned on the left side. Accordingly, with regards to the left/right pair of airbags 120a and 120b, the airbag 120a on the left side is an airbag positioned on the near side and the airbag 120b on the right side is an airbag positioned on the far side.

As illustrated in FIG. 2 and FIG. 3, in the occupant restraining device 100 of the present embodiment, the inner bag 140 is housed in a rearward area inside the left airbag 120a (nearside airbag) facing the vehicle body side 102 of the left and right pairs of airbags 120a and 120b. The inner bag 140 has a smaller volume than the airbag 120a because it is stowed inside the airbag 120*a*. Therefore, expansion and deployment of the inner bag 140 is completed with a smaller amount of gas than that for the airbag 120*a*. An inner vent 142 is formed in the inner bag 140. Thus, the airbag 120*a* and the inner bag 140 are connected at the inner vent 142.

When a vehicle collision is detected, gas is supplied to the inner bag 140 by an inflator (not illustrated). Therefore, the inner bag 140 completes expansion and deployment before the airbag 120*a*, as illustrated in FIG. 2(*a*). At this time, the inner bag 140 expands and deploys to the side of the torso P1 (see FIG. 3) of the occupant P inside the airbag 120*a* because the inner bag 140 is arranged in the rearward area of the airbag 120*a*. Thereafter, gas then flows out of the inner vent 142 of the inner bag 140, supplying gas to the airbag 120*a*. This completes expansion and deployment of the airbag 120*a*, as illustrated in FIG. 2(*b*).

As described above, with the occupant restraining device 100 of the present embodiment, the inner bag 140, which has a smaller capacity than the airbag 120*a*, expands and deploys to the side of the torso P1 of the occupant P before the airbag 120*a*. This allows the torso P1 of the occupant P to be restrained quickly during a collision. Therefore, high occupant restraining performance can be obtained by the occupant restraining device 100.

In particular, with the present embodiment, as illustrated in FIG. 3, the front end 140*a* of the inner bag 140 is arranged at a position overlapping with the tensile cloth 130*a* in a side view when the airbag 120*a* is expanded and deployed. As a result, the tensile cloth 130*a* does not stretch across the inner bag 140, and the tensile cloth 130*a* does not inhibit the expansion and deployment of the inner bag 140. Therefore, the effects described above can reliably be obtained.

Note, with this embodiment, a configuration in which the front end 140*a* of the inner bag 140 is arranged at a position overlapping with the tensile cloth 130*a* is illustrated, but is not limited thereto. For example, as illustrated in FIG. 4, the same effect can be obtained in a configuration in which the front end 140*a* of the inner bag 140 is arranged behind the position where the inner bag 140 overlaps with the tensile cloth 130*a*, that is, in a configuration in which the inner bag 140 and the tensile cloth 130*a* do not overlap in a side view.

Further, in the occupant restraining device 100 of the present embodiment, as illustrated in FIG. 2(*b*), when the airbags 120*a* and 120*b* expand and deploy, the tensile cloths 130*a* and 130*b* deploy to the side of the seat 110 by breaking open the surface skin of the seat 110. Therefore, the tensile cloths 130*a* and 130*b* are stretched from the seatback 112 to the seat cushion 114, and the surfaces opposite the occupant P of the airbags 120*a* and 120*b*, respectively, are retained by the tensile cloths 130*a* and 130*b*. Furthermore, the airbags 120*a* and 120*b* are then biased against the occupant P by the tensile cloths 130*a* and 130*b*, thereby enhancing the occupant restraining performance of the airbags 120*a* and 120*b*.

Embodiment 2

FIG. 5, FIG. 6, and FIG. 7 are diagrams illustrating an occupant restraining device 200 in embodiment 2. FIGS. 5(*a*) and (*b*) illustrate a state in which an occupant P is seated in the seat 110 illustrated in FIG. 1, and a state where the airbags 120*a* and 120*b* having been expanded and deployed is observed from above. FIG. 6 and FIG. 7 illustrate a state where an occupant P is seated in the seat 110 illustrated in FIG. 1, and the state where the airbag 120*a* having been expanded and deployed is observed from the side. Note that all components in embodiment 2 that are common with those of embodiment 1 are given the same sign and their explanations are omitted.

As illustrated in FIG. 5 and FIG. 6, in the occupant restraining device 200 of embodiment 2, a partition wall 240 is provided inside the airbag 120*a* instead of the inner bag 140 in embodiment 1. The partition wall 240 demarcates the interior of the airbag 120*a* into front and rear sections. In the interior of the airbag 120*a*, the space in front of the partition wall 240 is hereinafter referred to as the front chamber 122, and the space behind the partition wall 240 is referred to as the rear chamber 124. A connecting hole 242 is formed in the partition wall 240. This connects the front chamber 122 to the rear chamber 124.

As illustrated in FIG. 6, of the two chambers of the airbag 120*a*, the rear chamber 124 is arranged to the side of the torso P1 of the occupant P. When a vehicle collision is detected, of the parts of the airbag 120*a*, gas is supplied to the rear chamber 124 by an inflator (not illustrated). Therefore, with the airbag 120*a*, the rear chamber 124 completes expansion and deployment before the front chamber 122, as illustrated in FIG. 5(*a*).

Here, the rear chamber 124 expands and deploys to the side of the torso P1 of the occupant P (see FIG. 3), thereby quickly restraining the torso P1 of the occupant P in the event of a collision. Accordingly, high occupant restraining performance can be achieved by the occupant restraining device 200 during a collision, especially during a side impact.

Thereafter, gas flows from the connecting hole 242 of the partition wall 240 and is supplied to the front chamber 122. This completes expansion and deployment of the front chamber 122, as illustrated in FIG. 5(*b*). Accordingly, the occupant P is restrained by the front chamber 122 and the rear chamber 124, in other words, the entire airbag 120*a*.

In particular, with the present embodiment, as illustrated in FIG. 6, the partition wall 240 is arranged at a position overlapping with the tensile cloth 130*a* in a side view when the airbag 120*a* is expanded and deployed. As a result, the tensile cloth 130*a* does not stretch across the rear chamber 124, and the tensile cloth 130*a* does not inhibit expansion and deployment of the rear chamber 124. Therefore, the effects described above can reliably be obtained.

Note, with this embodiment, a configuration in which the partition wall 240 is arranged at a position overlapping with the tensile cloth 130*a* is illustrated, but is not limited thereto. For example, as illustrated in FIG. 7, the same effect can be obtained in a configuration in which the partition wall 240 is arranged rearward of the position where it overlaps with the tensile cloth 130*a*, in other words, in a configuration in which the rear chamber 124 and the tensile cloth 130*a* do not overlap in a side view.

In the description above, both the occupant restraining device 100 of embodiment 1 and the occupant restraining device 200 of embodiment 2 illustrate configurations in which the left side airbag 120*a* located on the near side has an inner bag 140 or a partition wall 240. However, these are not limitations thereto, and a configuration of positioning an airbag on the far side or a configuration in which both left and right airbags are provided with inner bags 140 or partition walls 240 are feasible.

FIG. 8 is a diagram illustrating another example of an occupant restraining device. The occupant restraining device 300 illustrated in FIG. 8 includes cases 118*a* and 118*b* arranged along the side of the seat 110. Case 118*a* is the case where airbags 120*a* and 120*b* are stowed and case 118*b* is the case where tensile cloths 130*a* and 130*b* are stowed.

With the occupant restraining device 300 illustrated in FIG. 8, the tensile cloths 130a and 130b are deployed from the case 118b to the side of the seat 110 during expansion and deployment of the airbags 120a and 120b. This configuration will also provide the same effects as the occupant restraining device 100 described above.

Preferred examples of the present invention were described above while referring to the accompanying drawings. However, the embodiments described above are preferred examples of the present invention, and other embodiments can be implemented or performed by various methods. In particular, unless described otherwise in the specification of the present application, the invention is not restricted to the shape, size, configurational disposition, and the like of parts illustrated in detail in the accompanying drawings. Furthermore, expressions and terms used in the specification of the present application are used for providing a description, and the invention is not limited thereto, unless specifically described otherwise.

Therefore, it is obvious that a person with ordinary skill in the art can conceive of various changed examples or modified examples within the scope described in the scope of the claims, which is understood to naturally belong to the technical scope of the present invention.

INDUSTRIAL APPLICABILITY

The present invention can be used in an occupant restraining device that restrains an occupant sitting on a seat of a vehicle.

REFERENCE NUMERALS

P1 . . . torso, 100 . . . occupant restraining device, 102 . . . vehicle body, 110 . . . seat, 112 . . . seatback, 114 . . . seat cushion, 116 . . . head rest, 118 . . . cover, 118a and 118b . . . cases, 120a . . . airbag, 120b . . . airbag, 122 . . . front chamber, 124 . . . rear chamber, 130a . . . tensile cloth, 130b . . . tensile cloth, 140 . . . inner bag, 140a . . . front end, 142 . . . Inner vent, 200 . . . occupant restraining device, 240 . . . partition wall, 242 . . . connecting hole, 300 . . . occupant restraining device, P . . . occupant

The invention claimed is:

1. An occupant restraining device for restraining an occupant sitting on a seat of a vehicle, comprising:
   first and second airbags stowed in opposite sides of a seatback of the seat that inflate and deploy respectively from both lateral sides of the seatback;
   an inner bag that is stowed inside the first airbag and is connected to the first airbag, the inner bag configured to expand and deploy inside the first airbag; and
   first and second tensile cloths stowed from within the seatback of the seat to within a seat cushion of the seat along an outer facing side of the first and second airbags, respectively; wherein
   wherein the inner bag completes expansion and deployment prior to the first airbag,
   wherein the first and second tensile cloths are deployed along the outer facing sides of the first and second airbags, respectively by expansion and deployment of the first and second airbags, and are stretched from the seatback to the seat cushion to retain a surface of both of the first and second airbags, and
   wherein a front end of the inner bag is arranged at or behind a position overlapping the first tensile cloth in a side view and the first tensile cloth downwardly extends across the first airbag along an arcuate path in the side view when the first airbag is expanded and deployed.

2. The occupant restraining device according to claim 1, wherein the first airbag is positioned on a near side of the seat.

3. The occupant restraining device according to claim 2, wherein first and second tensile cloths are deployed along the side of the seat by breaking open a surface skin of the seat.

4. The occupant restraining device according to claim 2, comprising:
   first and second cases in which the first and second airbags and first and second tensile cloths are stowed, arranged along the side of lateral sides of the seat, wherein
   the first and second tensile cloths deploy from the first and second cases, respectively, along the lateral sides of the seat.

5. The occupant restraining device according to claim 1, wherein the first and second tensile cloths are deployed along the side of the seat by breaking open a surface skin of the seat.

6. The occupant restraining device according to claim 1, comprising:
   first and second cases in which the first and second airbags and first and second tensile cloths are stowed, arranged along the lateral sides of the seat, wherein
   the first and second tensile cloths deploy from the first and second cases, respectively along the lateral sides of the seat.

7. The occupant restraining device according to claim 1, wherein the inner bag extends laterally beyond the first tensile cloth between the first tensile cloth and the seatback.

8. An occupant restraining device that restrains an occupant sitting on a seat of a vehicle, the occupant restraining device comprising:
   first and second airbags stowed in opposite sides of a seatback of the seat that inflate and deploy respectively from both lateral sides of the seatback;
   a partition wall arranged inside the first airbag and separating the first airbag into front and rear portions;
   a connecting hole formed in the partition wall; and
   first and second tensile cloths stowed from within the seatback of the seat to within a seat cushion of the seat along the side of the pair of airbags
   wherein
   the first airbag completes expansion and deployment of a first space behind the partition wall before a second space in front of the partition wall, and
   wherein the first and second tensile cloths are deployed along lateral sides the seat on outwardly facing sides of the first and second airbags, respectively, and are stretched from the seatback to the seat cushion to retain a surface of the each of the first and second airbags, and
   wherein the partition wall is arranged at or behind a position overlapping the first tensile cloth in a side view and the first tensile cloth downwardly extends across the first airbag along an arcuate path in the side view when the first airbag is expanded and deployed.

9. The occupant restraining device according to claim 8, wherein the first airbag is positioned on the near side of the seat.

10. The occupant restraining device according to claim 8, wherein the first and second tensile cloths are deployed along the side of the seat by breaking open a surface skin of the seat.

11. The occupant restraining device according to claim 8, comprising:
   first and second cases in which the first and second airbags and first and second tensile cloths are stowed, arranged along lateral sides of the seat, wherein
   the first and second tensile cloths deploy from the first and second cases along the lateral sides of the seat.

12. The occupant restraining device according to claim 8, wherein the inner bag extends laterally beyond the first tensile cloth between the first tensile cloth and the seatback.

\* \* \* \* \*